Patented Apr. 29, 1952

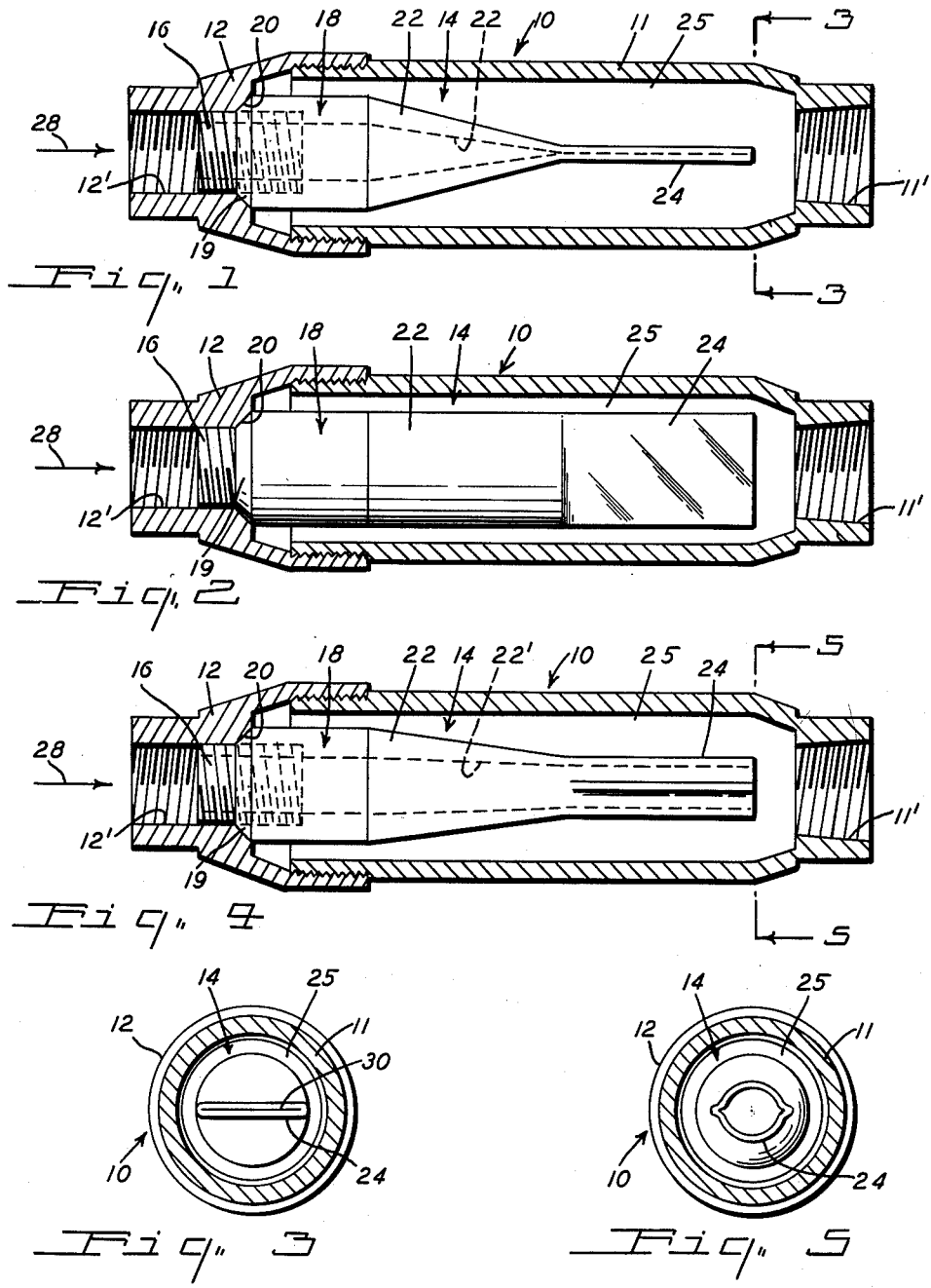

2,594,525

UNITED STATES PATENT OFFICE 2,594,525

VALVE

Clarence B. Walden and Cut Kravagna,
Los Angeles, Calif.

Application June 24, 1946, Serial No. 678,832

1 Claim. (Cl. 251—122)

This invention relates generally to automatic valves and particularly to check valves such as are used for controlling the flow of fluid through a pipe to prevent back flow thereof.

Ordinary types of check valves with which we are familiar have many disadvantages. Some, by reason of their construction, and the materials necessarily required to be used therein, are limited in their use to controlling only certain types of fluid. Others are ineffective to provide a positive seal against a back flow of fluid under all conditions. In this connection many such valves embody a non-resilient valve part which is subject to wear and to being held partially open by foreign matter which may lodge therein during closing action of the valve. Still others require periodic servicing to insure their acting efficiently.

It is an object of this invention to provide a check valve of simple construction which is usable in a variety of installations for positively controlling many different types of fluid, whether gas or liquid.

It is also an object to provide a valve of this nature which is easily installed and requires no servicing.

It is a particular object of the invention to provide a check valve embodying no metal working parts, discs, poppets or the like, such as are found in ordinary types of check valves, but which embodies a simple resilient valve member which easily opens under the influence of a flow of fluid through the valve in the normal direction and which is effective to provide a leakproof seal against any back flow under either high or low pressure heads.

It is also an object to provide a check valve which offers less resistance to the passage of liquids than ordinary check valves and one which has approximately twenty per cent greater capacity than an ordinary check valve of equivalent dimensions.

These and other objects will be apparent from the following description and accompanying drawings. Referring to the drawings, which are for illustrative purposes only:

Fig. 1 is a longitudinal section of a valve embodying the invention showing the valve member thereof in elevation and in normal closed position;

Fig. 2 is a sectional plan view of the device of Fig. 1;

Fig. 3 is a cross section on line 3—3 of Fig. 1;

Fig. 4 is a longitudinal section of the valve showing the valve member in open position; and Fig. 5 is a cross section on line 5—5 of Fig. 4.

The invention comprises a housing generally indicated by reference numeral 10, which, in the form illustrated, consists of a barrel 11 and a bell 12 threadably mounted thereon. The barrel and bell are each provided with a threaded opening, as indicated at 12' and 13' so the same may be mounted in a pipe or other installation.

The invention embodies a flexible valve member generally indicated by numeral 14 which is adapted to be positioned in the housing in any suitable manner and which, for purposes of illustration, is shown mounted on a nipple 16 which is threadedly mounted within the bore 12' of bell 12. The valve member 14 may be formed of a suitable flexible material having resiliency. However, it is preferred to make this member of a rubber-like material, such as a standard synthetic rubber which is resistant to attack or deterioration as a result of contact with oil and other fluids. The valve member 14 is preferably molded to the desired shape and vulcanized to the nipple 16.

The valve member itself, generally indicated by numeral 14, comprises an enlarged or inlet portion 18 having a relatively thick wall except in the region where it overlies and is mounted on the nipple 16. The member is provided with a shoulder 19 adapted to seat on a correspondingly tapered seat 20 in the bell to effect a seal in this region between the ports. Except for this shoulder, the inlet portion is generally cylindrical. Adjoining the inlet portion is an intermediate tapered section 22 having walls of gradually decreasing thickness toward the outlet end of the member, and beyond this is a flattened outlet or end section 24 formed of relatively thin-walled material. The flattened section 24 is normally in the position in which it is shown in Figs. 1 and 3; that is, the wall thereof is substantially in engagement throughout its interior surface so that the valve member may be considered as closed in its normal position.

Preferably the exterior diameter of the valve member is substantially less than the interior diameter of the barrel 11 in order that the valve member will readily collapse, as will later be described. Thus, the housing and the valve member are so proportioned as to permit of the flattened portion of the valve member being contained within the housing without distorting the flattened section and are so proportioned that they provide a space 25 about the flattened portion 24 of the valve member which is in direct communication with the outlet opening 11'. The flattened section 24 is also of sufficient size that it may be expanded into a tubular fluid carrying member having an internal diameter, when expanded, equal to or greater than the internal diameter of the nipple 16, as shown in Fig. 4.

In the operation of the valve, the valve housing is positioned in a fluid line in which the direction of the normal flow of fluid is indicated by the arrow 28 in Fig. 4. The fluid enters the valve member through the nipple 16 and passes through the converging passage 22' within the tapered portion 22 and the pressure of the flowing fluid is sufficient, in the absence of a greater back pressure, to expand the valve member in the region 22 and the flattened section 24 to convert the valve member into an open conduit for the uninterrupted flow of the fluid therethrough, such as indicated in Fig. 4. The cross sectional shape of the flattened section 24 when expanded is shown in Fig. 5. If the flow of fluid should stop and there should be any tendency toward a back flow, or if the back pressure should be greater than the pressure of the fluid tending to enter the valve in the direction of the arrow 28, the back pressure acts upon the outer surfaces of the flattened section 24 and collapses it from its shape of Fig. 4 to that of Fig. 1, the pressure on the outer surface thereof serving to force the walls together tightly in the region 30 shown in Fig. 3, thereby providing a positive seal or closure, preventing any return flow or back flow of fluid through the valve member. In this connection it is apparent from the construction shown that the area of the valve member subjected to the pressure of any fluid attempting to flow in a direction counter to that of the arrow 28, is greater than the area subjected to the pressure action of the fluid within the nipple 16 and valve member and, in consequence, if at any time the pressure in the space or area 25 exceeds that within the valve member, the valve member is automatically sealed or closed and no fluid is permitted to flow in a direction counter to that of the arrow 28 (Fig. 4).

As pointed out above, when there is even only a slight back pressure on the valve, the valve immediately collapses or returns from its position of Fig. 4 to that of Fig. 1. However, if there is a substantial differential of pressure with the back pressure exceeding the pressure of fluid tending to flow through the valve, the intermediate section 22 of the valve member will also tend to collapse in the region adjacent the flattened section 24. In cases where the valve is subjected to a back pressure which may exceed the pressure at the inlet end of the valve by, for example, 100 or more pounds per square inch, substantially the entire intermediate section 22 of the valve will collapse.

By utilizing a resilient material for the valve member 14, the valve is not subjected to being held open by small particles of foreign matter which may lodge or become entrapped between the walls of the flattened section 24 as the valve closes since the resilience of the material is sufficient to accommodate such particles. In addition, the flattened section 24 is made relatively large in order to provide a large sealing area 30, thereby further insuring a positive sealing of the valve.

As indicated before, it is preferred to make the valve member in a molding operation, rather than by an extrusion process or other means, and to form the member with a relatively thick wall in the region thereof to overlie the nipple with walls of gradually tapering thickness therefrom down to the flattened section 24 which is relatively thin walled. With this construction the member is sufficiently stiff and durable in the region of the nipple to prevent failure at this point and at the same time sufficiently flexible at the flat section to insure positive sealing under the influence of back pressure and full expansion for normal flow therethrough.

It is contemplated that various changes and modifications may be made without departing from the scope of the invention which is defined in the claim.

We claim:

A check valve comprising a barrel, a bell mounted at one end of said barrel having an annular seat therein, a nipple mounted in said bell and extending interiorly thereof, and a tubular valve member of flexible material mounted on said nipple and extending therefrom longitudinally within said barrel, said valve member being formed of a resilient flexible material and having a shoulder bearing against said seat in said bell, a relatively thick-walled cylindrical portion in the region of said nipple beyond said shoulder, a flattened relatively thin-walled end section at its end opposite the end mounted on said nipple capable of being expanded to form a tubular fluid carrying means under influence of pressure exerted by fluid entering said valve member through said nipple, and an intermediate converging section having walls tapering in thickness from said cylindrical portion to said flattened section.

CLARENCE B. WALDEN.
CUT KRAVAGNA.

REFERENCES CITED

The following references are of record in the file of this patent:

UNITED STATES PATENTS

| Number | Name | Date |
|---|---|---|
| 24,476 | Mayall | June 21, 1859 |
| 189,795 | Schultz | Apr. 17, 1877 |
| 488,160 | Buhrman | Dec. 13, 1892 |
| 679,201 | Allison | July 23, 1901 |
| 783,610 | Chaplin | Feb. 28, 1905 |
| 1,282,075 | Hand | Oct. 22, 1918 |
| 1,326,966 | Reeves | Jan. 6, 1920 |
| 1,576,331 | Kelley, et al. | Mar. 9, 1926 |
| 1,596,520 | Eskholme | Aug. 17, 1926 |
| 2,417,968 | Browne | Mar. 25, 1947 |
| 2,431,457 | Bondurant | Nov. 25, 1947 |